United States Patent [19]

Welle, Jr. et al.

[11] Patent Number: 4,786,799
[45] Date of Patent: Nov. 22, 1988

[54] POWER CONTROL FOR COOKING APPLIANCE WITH MULTIPLE HEATING UNITS

[75] Inventors: Louis A. Welle, Jr.; Thomas R. Payne, both of Louisville, Ky.

[73] Assignee: General Electric Company, Louisville, Ky.

[21] Appl. No.: 78,265

[22] Filed: Jul. 27, 1987

[51] Int. Cl.⁴ .............................................. H05B 1/02
[52] U.S. Cl. .................................... 219/486; 219/483; 219/501; 307/13; 307/38
[58] Field of Search ............................... 219/483–486, 219/492, 501, 10.55 B, 497, 494; 307/38–41, 117, 12, 13; 323/319, 235, 236

[56] References Cited

U.S. PATENT DOCUMENTS

| | | | |
|---|---|---|---|
| 4,100,426 | 7/1978 | Baranowski et al. | 307/41 |
| 4,115,677 | 9/1978 | Yamamura et al. | 219/10.49 R |
| 4,214,171 | 7/1980 | Gyori | 307/41 |
| 4,227,062 | 10/1980 | Payne et al. | 219/486 |
| 4,233,498 | 11/1980 | Payne et al. | 307/41 |
| 4,282,422 | 8/1981 | Payne et al. | 219/486 |
| 4,313,061 | 1/1982 | Thomas | 307/32 |
| 4,410,794 | 10/1988 | Williams | 219/486 |
| 4,564,733 | 1/1986 | Karklys | 219/10.77 |

Primary Examiner—M. H. Paschall
Attorney, Agent, or Firm—H. Neil Houser; Radford M. Reams

[57] ABSTRACT

An improved electric cooking appliance with a plurality of heating units arranged in two groups, a first group adapted for energization by a first AC power signal and a second group adapted for energization by a second AC power signal, 180° out of phase relative to the first power signal. The heating units of the first and second groups are each connected to a common neutral power line. The output power of each of the heating units is controlled in accordance with the user selected power setting for each unit by selectively applying current pulses to each heating unit at a pulse repetition rate corresponding to the user selected power setting for that heating unit, with the application of current pulses to each heating unit being further controlled to minimize the concurrent application of current pulses to those heating units energized by the same one of the first and second power signals and to maximize the concurrent application of current pulses to those heating units energized by different ones of the first and second power signals, thereby minimizing the peak current pulses in the common neutral line.

8 Claims, 10 Drawing Sheets

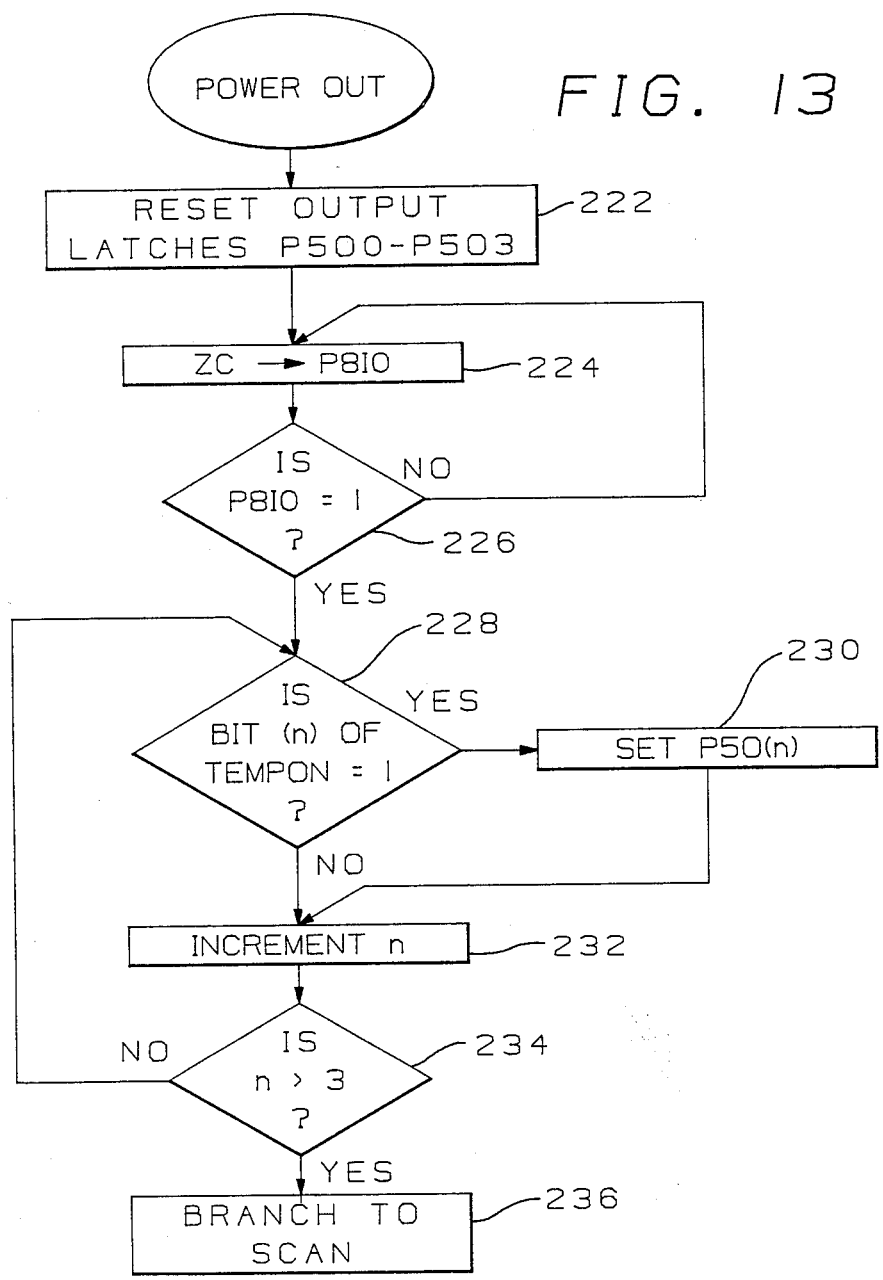

POWER CONTROL FOR COOKING APPLIANCE WITH MULTIPLE HEATING UNITS

BACKGROUND OF THE INVENTION

This invention relates generally to electric cooking appliances and particularly to electric cooking appliances incorporating electronic power control systems.

Commonly assigned U.S. Pat. No. 4,282,422 to Payne et al discloses a power control system for electric cooking appliances using infrared heating units made of resistive materials characterized by high positive temperature coefficient of resistivity, low thermal mass, and low specific heat, such as molybdenum disilicide and tungsten. The power control system therein described addresses the control problem presented by the dynamic thermal and electrical characteristics of such heating units in which the resistance typically increases by an order of magnitude as the temperature of the unit increases from room temperature to operating temperature and which changes temperature rapidly (the first thermal time constant is on the order of 600–1000 milliseconds). The power control system provides rapid switching and uses repetition rate control to space the brief ON times associated with the lower power settings so as to limit cooling between ON times to prevent excessive current surges.

Power control for each heating unit is accomplished by generating a multi-bit digital control word for each unit representing the power level to be applied to the unit. The state of each bit determines whether power is to be applied to the associated unit for one control interval. The word for each heating unit is updated once each control period. Each control period comprises a number of control intervals equal to the number of heating units. Power control for each unit is staggered by testing a bit of a different positional value in each word during any one control interval. The resultant staggering of energization of the heating units tends to reduce the total current drawn by the multi-unit cooking appliance during any one control interval.

Infrared heating units designed for energization by a 120 volt AC supply rather than a 240 volt supply can be fabricated using less costly, more durable resistance wire resulting in less expensive and more reliable units. However, achieving the same output power at the lower voltage obviously requires substantially higher operating currents. Due to the aforementioned dynamic characteristics of the resistance wire used in such units, the instantaneous peak currents can be undesirably high, particularly in the common neutral line when operating multiple heating units especially at the lower power settings.

The '422 staggering approach effectively limits total peak load current drawn by the appliance at the lower power settings, particularly for the current levels typical of 240 volt operation. However, the high peak neutral line current associated with 120 volt operation under certain operating conditions may not be adequately limited by the staggering approach. Hence, there is a need for a control arrangement which satisfactorily limits peak neutral line current over a relatively wide range of power settings to permit fuller realization of the cost savings achievable through use of heating units designed for energization at 120 volts.

It is therefore an object of the present invention to provide an electric cooking appliance of the type having multiple heating units connected to a common neutral power line in which the application of current pulses to each heating unit is controlled so as to minimize the instantaneous peak current in the neutral power line.

SUMMARY OF THE INVENTION

In accordance with the present invention an improved electric cooking appliance is provided with a plurality of heating units for heating cooking utensils placed in proximity thereto. The heating units are arranged in two groups, a first group adapted for energization by a first AC power signal and a second group adapted for energization by a second AC power signal, 180° out of phase relative to the first power signal. The heating units of the first and second groups are each connected to a common neutral power line. The appliance further comprises user actuable input selection means for enabling the user to select one of a plurality of power settings for each of the heating units. Power control means responsive to the user actuable input selection means controls the output power of each of the heating units in accordance with the user selected power setting for each unit by selectively applying current pulses to each heating unit at a pulse repetition rate corresponding to the user selected power setting for that heating unit. The power control means is further operative to control application of current pulses to each heating unit so as to minimize the concurrent application of current pulses to those heating units energized by the same one of the first and second power signals and to maximize the concurrent application of current pulses to those heating units energized by different ones of the first and second power signals, thereby minimizing the peak current pulses in the common neutral line.

In a preferred form of the invention the control means comprises memory means for storing two sets of control words. Each set includes a control word associated with each power setting. Each control word comprises a plurality of bits arranged in a bit pattern representing the repetition rate for the associated one of the user selectable power settings. The control means further includes means for selecting the control word associated with the user selected power setting from that one of the sets which minimizes neutral line current when more than one heating unit is operating and means for successively testing the state of each bit of the control word for the user selected power setting for each heating unit. One bit for each unit is tested during each cycle of the power signal. The control means is operative at the beginning of the next occurring cycle of the power signal to apply a current pulse to the corresponding heating unit when the tested bit is in a first state. Otherwise, no pulse is applied to the unit. The bit patterns for the control words in the second set are shifted relative to the corresponding control words in the first set so as to minimize the alignment of first state bits for control words in the second set relative to control words in the first set. The control words are selected by the control means from the same set to control energization of heating units energized by different ones of the first and second power signals and from different sets to control energization of heating units energized by the same one of the first and second power signals. By this arrangement the concurrence of current pulses for heating units energized by the same power signal is minimized and the concurrence of current pulses for heating units energized by different one of the power signals is maximized, thereby minimizing peak neutral line current.

In accordance with another aspect of the present invention, the control means is further operative when operating two heating units from one group and one from the other group to select the control word for the one odd unit from that set of control words which maximizes the concurrent application of current pulses to the odd unit and to that one of the other two heating units which is being operated at the relatively higher power setting so as to minimize current in the neutral line. In a preferred form of the invention the cooking appliance comprises at least four heating units with two units in each of the first and second groups. The power control means is operative when operating any three of the four surface units to choose a power control word for the odd unit, from the same set as that one of the other two units operating at the higher power setting.

BRIEF DESCRIPTION OF THE DRAWINGS

FIG. 13 is a flow diagram of the Power Out routine incorporated in the control program of the microprocessor in the circuit of FIG. 8.

DETAILED DESCRIPTION

Overview

Figure 1:
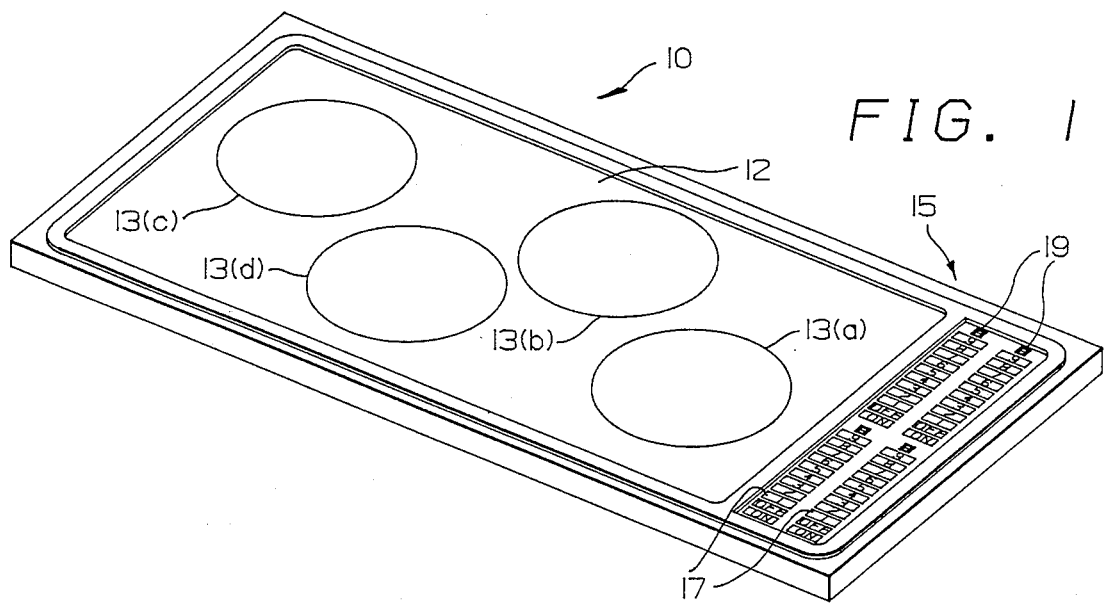
FIG. 1 is a perspective view of a portion of a cooktop illustratively embodying the power control cooking appliance of the present invention.

FIG. 1 illustrates the cooktop portion of a glass-ceramic cooktop appliance designated generally 10. Cooktop appliance 10 has a generally planar glass-ceramic cooking surface 12. Circular patterns 13(a)-13(d) identify the relative lateral positions of each of four heating units (not shown) located directly underneath surface 12. A control and display panel generally designated 15 includes a complete set of touch control keys 17 and a seven-segment digital LED display element 19 for each heating unit.

Figure 2:
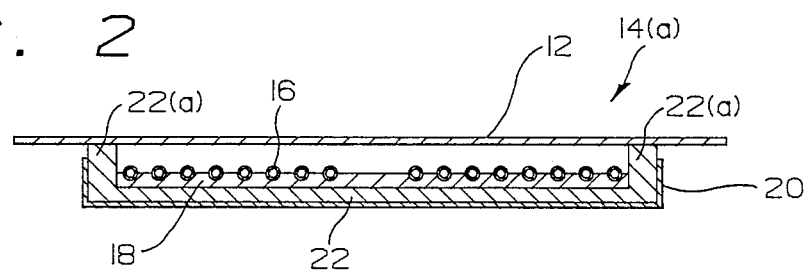
FIG. 2 is a sectional side view of a portion of the cooktop of FIG. 1 showing details of a heating unit.
Figure 3:
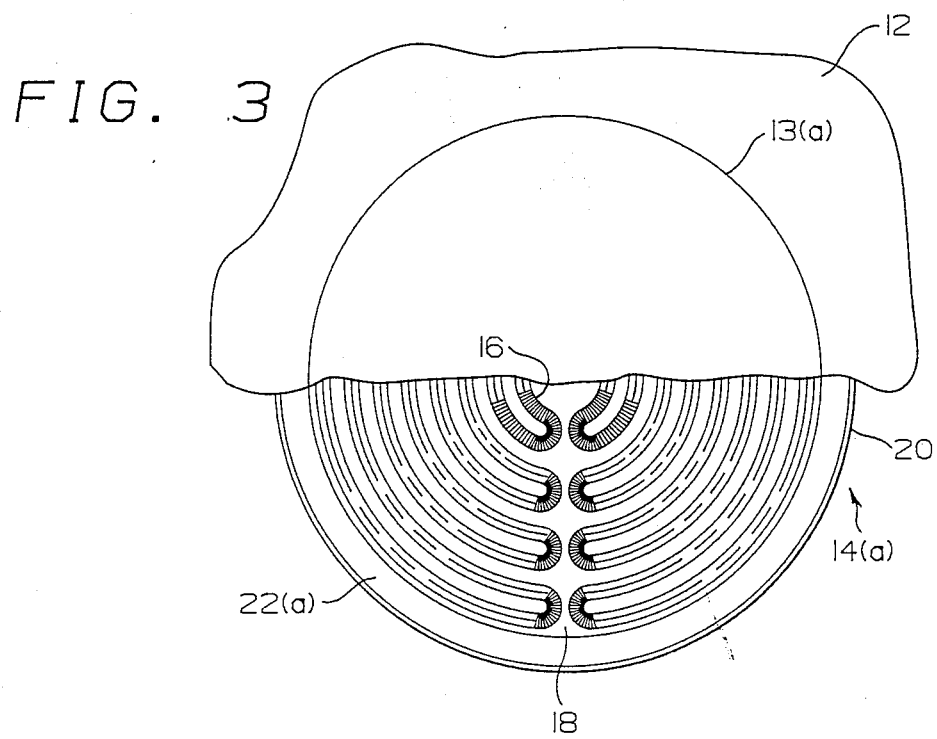
FIG. 3 is an enlarged top view of a portion of the cooktop of FIG. 1 showing details of the heating unit.

In the discussion to follow the designators 14(a)-14(d) shall be understood to refer to the heating units disposed under patterns 13(a)-13(d) respectively. Heating unit 14(a) is shown in greater detail in FIGS. 2 and 3. For purposes of illustration only one of the heating units is shown. It will be understood that heating units 14(b)-14(d) are similar in structure to that shown in FIGS. 2 and 3.

Referring again to FIGS. 2 and 3, heating unit 14(a) comprises an open coil electrical resistance element 16 of spiral configuration, which is designed when fully energized to radiate primarily in the infrared (1-3 micron) region of the electromagnetic energy spectrum. The resistance of element 16 increases by approximately one order of magnitude as its temperature increases from room temperature to its normal operating temperature range. Element 16 is arranged in a concentric coil pattern and staked or otherwise secured to a support disk 18 formed of Micropore material such as is available from Ceramaspeed under the name Microtherm. Disk 18 is supported in a sheet metal support pan 20, by an insulating liner 22 formed of a conventional aluminum oxide, silicon oxide composition. This insulating liner 22 includes an annular upwardly extending portion 22(a) which serves as an insulating spacer between disk 18 and the underside of glass-ceramic cooktop 12. When fully assembled, pan 20 is spring loaded upwardly forcing the annular portion 22(a) of insulating liner 22 into abutting engagement with the underside of cooktop 12 by support means not shown. Heating units 14(a)-14(d) are manufactured and sold commercially by Ceramaspeed under the part name Fast Start Radiant Heater with Concentric Coil Pattern.

Figure 4:
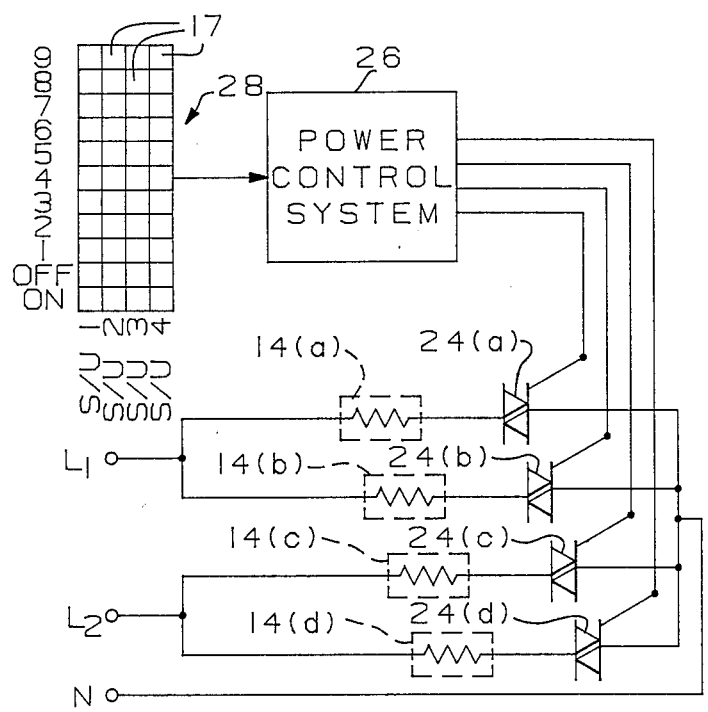
FIG. 4 is a functional block diagram of the power control word circuitry for the cooktop of FIG. 1.

FIG. 4 illustrates in simplified schematic form, an embodiment of a heating system for a cooking appliance controlled in accordance with the present invention. Heating units 14(a)-14(d) are connected to common neutral power line N. Each unit is energized by 120 volt 60 Hz AC power signal. However, for reasons which will be discussed in greater detail in the description to follow, a first group of heating units comprising units 14(a) and 14(b) are connected to power line L1 via triacs 24(a) and 24(b) respectively, and a second group of heating units comprising units 14(c) and 14(d) are connected to power line L2 via triacs 24(c) and 24(d) respectively. Lines L1, L2 and N comprise a conventional 3 wire 240 volt AC domestic power supply which provides a first 120 volt power signal across L1 and N and a second 120 volt power signal across L2 and N. As is standard with such two phase supplies, the second signal is 180° out of phase with the first signal.

Gate signals are applied to triacs 24(a)-24(d) to couple current pulses to heating units 14(a)-14(d) respectively. Each current pulse comprises a full cycle of the 120 volt, 60 Hz AC power signal. Power control system 26 controls the power applied to heating units 14(a)-14(d) by controlling the rate at which gate pulses are applied to the gate terminals of triacs 24(a)-24(d) in accordance with power setting selections for each heating unit entered by user actuation of tactile touch membrane switch keyboard 28 comprising touch keys 17. The columns of keys designated SU1 through SU4 provide the control inputs for heating units 14(a)-14(d) respectively.

Figure 5:
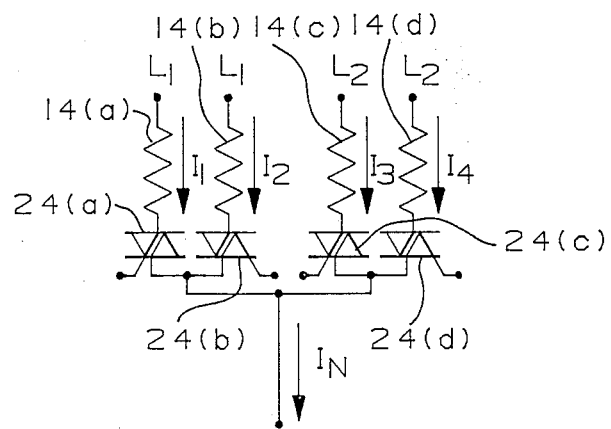
FIG. 5 is a highly simplified partial schematic circuit diagram of a portion of the power control circuitry for the cooktop of FIG. 1 showing the four resistive heating elements connected to a common neutral line and defining the direction of current flow for purposes of illustrating system operation.

It will be recalled that a primary object of the present invention is to minimize the instantaneous peak current in the neutral line when operating more than one heating unit. The conceptual solution to the problem of excess neutral line current in accordance with the invention will now be described with reference to the simplified partial schematic diagram of FIG. 5 and the current wave forms of FIGS. 6A-6D. In FIG. 5 arrows $I_1-I_4$ and $I_N$ define the positive direction of current flow in units 14(a)-14(d) and neutral line N respectively. For purposes of conceptual illustration a simplified control scheme is assumed comprising a four cycle control period for each unit. Table I illustrates the four power settings for this simplified four cycle control period. In the Power Level Code Logical 1's represent conductive cycles or current pulses and 0's represent non-conductive cycles. Thus, for power level 1, one current pulse is applied every four cycles of the power signal; for power level 2, a current pulse is applied every other cycle; for power level 3, current pulses are applied during three consecutive cycles followed by an OFF cycle; and for power level 4, current pulses are applied every cycle.

TABLE I

| Power Level | Power Level Code | % ON Times |
|---|---|---|
| 0 | 0 0 0 0 | 0 |
| 1 | 1 0 0 0 | 25 |
| 2 | 1 0 1 0 | 50 |
| 3 | 1 1 1 0 | 75 |
| 4 | 1 1 1 1 | 100 |

Figure 6A:
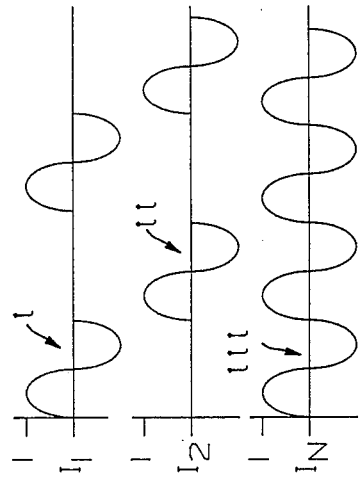
FIGS. 6A-6D illustrate the current waveform in each of the resistive units of FIG. 5 and the cumulative current flow in the neutral line for the circuit of FIG. 5 for various combinations of operating heating units for illustration of system operation.

Curves i, ii and iii in FIG. 6A illustrates the normalized current wave form for current flowing in heating units 14(a) and 14(b) and the neutral line respectively when energized by the same power signal namely the signal at L1 and operating at power level 2. As shown, current pulses are concurrently applied to units 14(a) and 14(b). The resultant instantaneous peak current in the neutral line $I_N$ is the sum of currents $I_1$ and $I_2$ which, as shown at iii, is double the magnitude of the current in either unit 14(a) or 14(b).

Figure 6C:
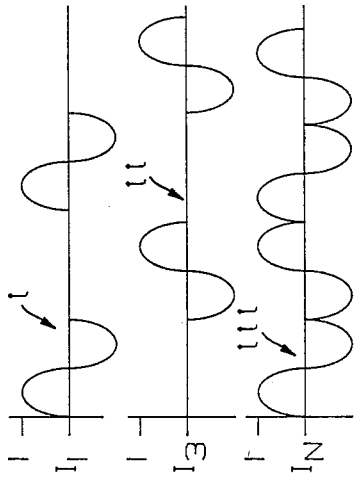
Figure 6B:
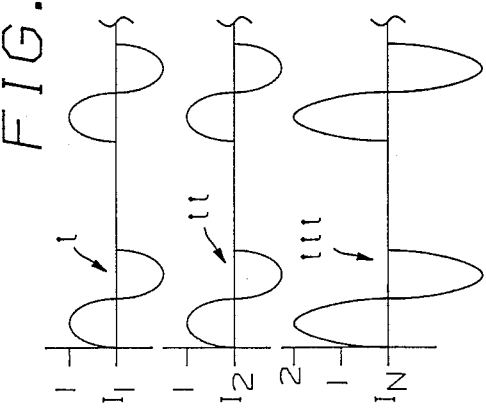

Similarly, FIG. 6B illustrates the effect of energizing each of two heating units by a different power signal, one being 180° out of phase relative to the other. Specifically, curves i, ii, and iii in FIG. 6B show the current waveforms for heating unit 14(a), energized by the power signal on L1, 14(c) energized by the power signal on L2, with both units again operating at power level 2, and the neutral line current respectively. As shown, the magnitude of the current in each individual heating unit is the same as in FIG. 6A. However, since the power signals are 180° out of phase with each other, the current in the neutral line is zero.

FIG. 6C illustrates at i and ii, the operation of two heating units energized by the same power signal operating at power level 2 with the current pulses misaligned to minimize the overlap of current pulses, that is to minimize the concurrent application of current pulses to the two heating units. The resultant neutral line current waveform is shown at iii. Clearly, when there is no overlap of current pulses, the instantaneous peak current in the neutral line equals the peak current for either one of the two individual heating units.

Figure 6D:
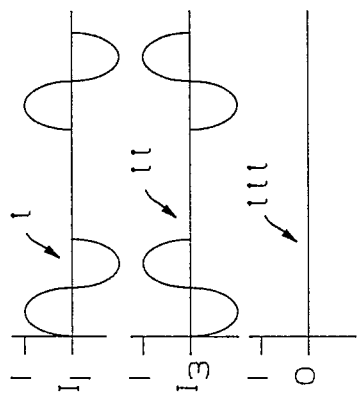

However, as shown in FIG. 6D, a similar misalignment of the current pulses for heating units energized out of phase by power signals from different lines results in a greater neutral line current than would result from aligning the 180° out of phase pulses because the cancellation effect is lost.

These examples illustrate the basic concept underlying the subject invention, namely that instantaneous peak currents in the neutral line may be minimized by minimizing the concurrent application of current pulses to surface units energized in phase such as by the same power signal whether it be L1 or L2, and maximizing the concurrent application of current pulses to heating units energized by different power signals, one being 180° out of phase relative to the other such as the signals at L1 and L2.

Having described theconcept with respect to a simplified system, it remains to describe implementation of this concept in the appliance of the illustrative embodiment which provides a greater selection of power levels than the simplified example for more versatility and better cooking performance. As in the simplified example, a plurality of discrete power levels are provided for each heating unit, each having uniquely associated with it a particular power pulse repetition rate. However, in this embodiment nine non-Off power levels are implementable by the control system and the basic control period for each heating unit comprises 64 full cycles of the 60 Hz power signal. These nine power settings, corresponding to power levels 1-9, and Off and On settings are selectable for each heating unit by user actuation of the keys in keyboard 28. Table II shows the power pulse repetition rate associated with each power level.

TABLE II

| Power Settings | Power Pulse Repetition Rate | Look Up Tables ||||||||
|---|---|---|---|---|---|---|---|---|---|
| | | Table A |||| Table B ||||
| | | Address | Control Word Code ||| | Address | Control Word Code |||
| OFF | — | TBLA | 0000 | 0000 | 0000 | 0000 | TBLB | 0000 | 0000 | 0000 | 0000 |
| ON | — | TBLA | 0000 | 0000 | 0000 | 0000 | TBLB | 0000 | 0000 | 0000 | 0000 |
| 1 | 1/64 | TBLA +8 | 8000 | 0000 | 0000 | 0000 | TBLB +8 | 4000 | 0000 | 0000 | 0000 |
| 2 | 2/64 | TBLA +10 | 8000 | 0000 | 8000 | 0000 | TBLB +10 | 4000 | 0000 | 4000 | 0000 |
| 3 | 4/64 | TBLA +18 | 8000 | 8000 | 8000 | 8000 | TBLB +18 | 4000 | 4000 | 4000 | 4000 |
| 4 | 8/64 | TBLA +20 | 8080 | 8080 | 8080 | 8080 | TBLB +20 | 4040 | 4040 | 4040 | 4040 |
| 5 | 12/64 | TBLA +28 | 8088 | 8088 | 8088 | 8088 | TBLB +28 | 4044 | 4044 | 4044 | 4044 |
| 6 | 18/64 | TBLA +30 | A888 | 8888 | A888 | 8888 | TBLB +30 | 5444 | 4444 | 5444 | 4444 |
| 7 | 28/64 | TBLA +38 | AA8A | AA8A | AA8A | AA8A | TBLB +38 | 5545 | 5545 | 5545 | 5545 |
| 8 | 42/64 | TBLA +40 | EEAE | EEAE | EEAA | EEAA | TBLB +40 | 7757 | 7757 | 7755 | 7755 |

TABLE II-continued

| Power Settings | Power Pulse Repetition Rate | Look Up Tables | | | | | | | | |
|---|---|---|---|---|---|---|---|---|---|---|
| | | Table A | | | | | Table B | | | |
| | | Address | Control Word Code | | | | Address | Control Word Code | | | |
| 9 | 64/64 | TBLA +48 | FFFF | FFFF | FFFF | FFFF | TBLB +48 | FFFF | FFFF | FFFF | FFFF |

As will be hereinafter described in greater detail, a 64 bit digital control word is associated with each user selectable power setting. The control word codes for the 64 bit control words which define pulse repetition rates for settings 1–9 are listed in Look-up Table A of Table II. ON pulses or cycles are represented by logical one bits and non-conductive or OFF cycles by logical zero bits respectively. The power control means includes means for successively testing the state of each bit of the control word corresponding to the user selected power setting for each heating unit. One bit for each unit is tested during each cycle of the power signal. The control means switches the corresponding one of switch means 24(a)–24(d) to its conductive state at the beginning of the next occurring cycle when the tested bit is in its first or logical 1 state. The switch means remains non-conductive when the tested bit is in its second or zero state. Thus, the number and spacing of ON of conductive cycles over the 64 cycle control period for each power setting is defined by the bit pattern of its associated control word. The bit patterns for each repetition rate have been selected to distribute the OFF time evenly across the control period so as to minimize the duration of idle or OFF cycles. The particular number of user selectable power settings, the repetition rates represented in the Look Up Tables for each of the corresponding power levels, and the duration of the control period have been empirically established to provide a range of power settings for good cooking performance in the appliance of the illustrative embodiment.

Figure 7:
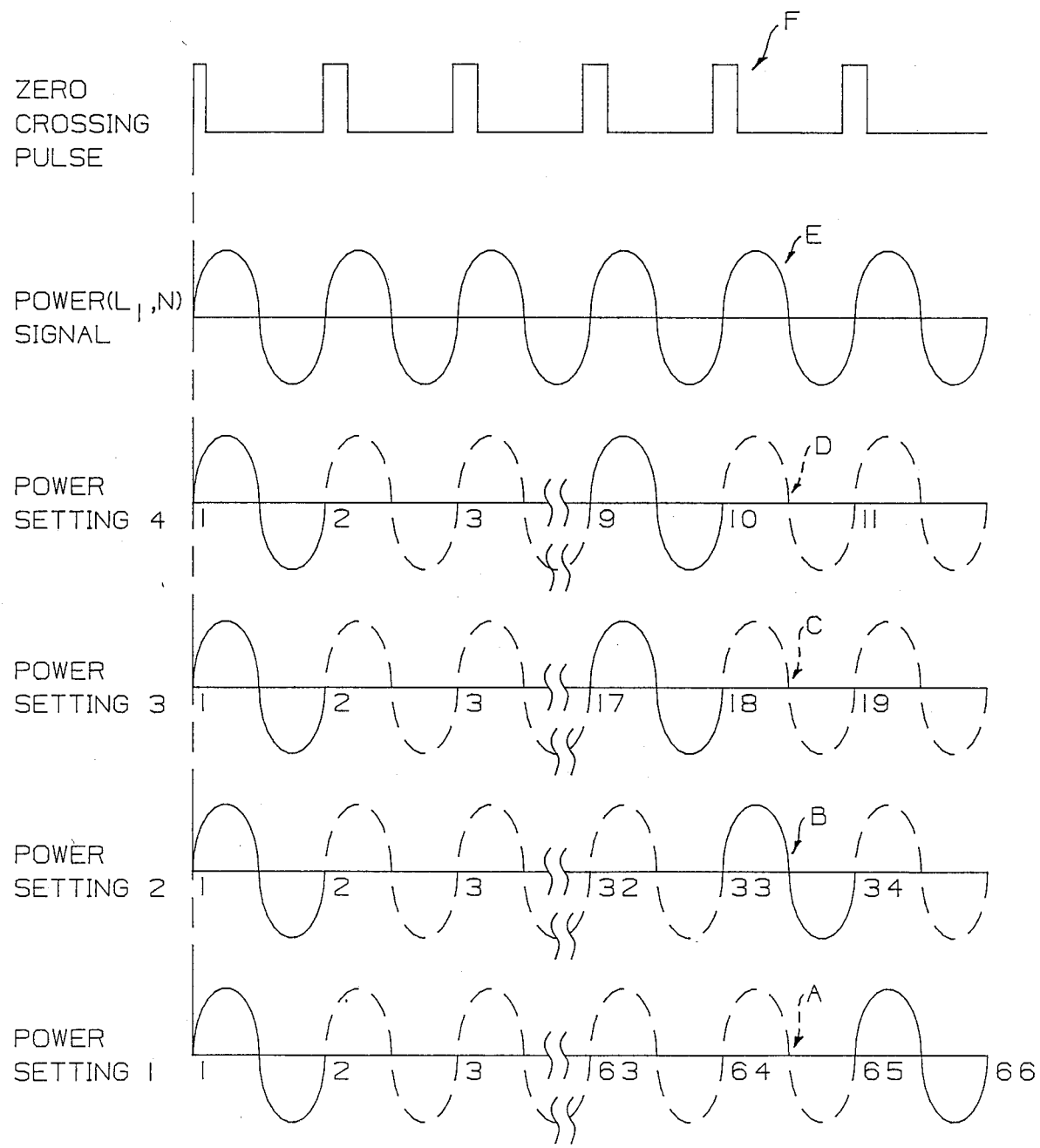
FIG. 7 illustrates power signals corresponding to various operator selectable power settings and a timing signal for synchronizing control system operation with the power signal for the cooktop of FIG. 1.

For purposes of illustration FIG. 7 shows waveforms A–D representing the voltage applied to heating units 14(a) for power settings 1 through 4 respectively. Wave form E represents the power signal appearing across lines L1 and N. ON cycles, that is, cycles of the power signal during which the triac is conductive, are represented by full lines. OFF cycles, that is, those cycles of the power signal during which the triac is non-conductive, are shown in phantom lines. As shown in Table II, the pulse repetition rate for the first four power settings range from 1 ON cycle per 64 power cycles for power setting 1, the lowest non-Off power setting, to 1 ON cycle for every 8 cycles for power level 4.

It will be recalled that in order to minimize the instantaneous current in the neutral line, the control system is to control the application of current pulses to each heating unit so as to minimize the concurrent application of pulses to heating units energized by the same power signal and to maximize the concurrent application of pulses to heating units energized by different power signals. To this end, in a preferred form of the invention the power control means comprises memory means for storing two sets of control words. Each set contains a control word for each power setting. Corresponding words in each set provide the same repetition rate and same spacing between ON pulses, and are essentially identical except that the bit patterns in one set are shifted relative to the other so as to minimize the alignment or overlap of logical 1 bits between the two sets.

Referring again to Table II, in the illustrative embodiment, Look-up Tables A and B are stored in the memory of the power control system as the two sets of control words, each control word comprising a plurality of bits arranged to define a bit pattern corresponding to an associated one of user selectable power levels 1–9. Tables A and B each represent control word codes for the same power levels 1–9. However, the bit patterns for the control words of Table B are shifted or offset relative to that of Table A so as to minimize the alignment or overlap of logical 1 bits between the words in Table A and the words in Table B.

The control means is operative to select control words from the first and second sets so as to minimize the concurrent application of current pulses to heating units energized by the same power signal and to maximize the concurrent application of current pulses applied to heating units energized by different power signals thereby minimizing peak current pulses in the common neutral line. In a preferred form of the invention the control means is operative to select one control word from each of the first and second sets for units energized by the same one of power signals on L1 or L2 and to select control words from the same set for heating units energized by different ones of the first and second power signals L1 and L2.

When three of the four surface units have been selected for operation, the control means is operative to choose a control word for that odd one of the three heating units not energized by the same power signal from that one of the first or second sets of control words which maximizes the concurrent application of current pulses to the odd heating unit and that one of the two heating units energized by the same signal which is operating at the higher power setting.

TABLE IIIA

| Operating States | | | |
|---|---|---|---|
| SU0 | SU1 | SU2 | SU3 |
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

TABLE IIIB

| Action States | | | |
|---|---|---|---|
| SU0 | SU1 | SU2 | SU3 |
| 0 | 1 | 1 | 0 |

TABLE IIIB-continued

| | Action States | | |
|---|---|---|---|
| SU0 | SU1 | SU2 | SU3 |
| 0 | 1 | 1 | 1 |
| 1 | 0 | 0 | 1 |
| 1 | 0 | 1 | 1 |
| 1 | 1 | 0 | 1 |
| 1 | 1 | 1 | 0 |

In implementing the above-described control word selection process in the illustrative embodiment, the controller is programmed to normally select control words from Table A for heating units 14(a) and 14(c) and from Table B for 14(b) and 14(d). This normal selection process is referred to hereinafter as the default mode. The control words for Tables A and B are selected such that in the default mode, the current pulses for unit 14(a) are inherently aligned with 14(c) and units 14(b) with 14(d). The current pulses are inherently misaligned between units 14(a) and 14(b) and between units 14(c) and 14(d).

Table IIIA illustrates the sixteen possible user selectable operating states for the four unit cooktop of the illustrative embodiment. The designators SU0-SU3 refer to heating units 14(a)-14(d) respectively. A logical one in the SU(n) column indicates that the nth surface unit has been turned ON by the user, a zero in the column signifies the unit is turned OFF.

Of these 16 operating states, 11 states involve multiple units being selected for operation. Of these 11 stats, 5 states are controlled in accordance with the default mode. For the remaining 6 states shown in Table IIIB, additional control decisions are required to insure the desired alignment or misalignment of logical one bits to minimize the neutral line current.

The first action state in Table IIIB (0110) represents the selection of units 14(b) and 14(c) only. In this instance, since 14(b) and 14(c) are energized by different power signals, it is desirable to maximize the concurrent application of current pulses by maximizing the alignment of logical one bits. This is achieved by selecting the control word for each unit from the same set. However, in the default mode the word for 14(b) would be selected from Table A and the word for 14(c) from Table B. The control system, upon detecting the existence of this action state, departs from the default mode and shifts word selection for 14(c) from Table B to Table A.

Similarly, when heating units 14(a) and 14(d) only are turned ON by the user (action state 1001), a departure from the default mode is also required. Upon detection of this state, selection of the control word for 14(d) is shifted from Table B to Table A.

It will be appreciated that in each of these instances the same results could be obtained by shifting the control word selection for units 14(b) and 14(a) respectively rather than 14(c) and 14(d).

The remaining four action states in Table IIIB address the selection by the user of three heating units to be ON simultaneously. In each instance, two units will necessarily be energized by the same power signal and the third or odd unit will be energized by the other power signal. Proper alignment of the two units energized by the same signal will be taken care of inherently by the default mode in which a control word is selected from Table A for one and from Table B for the other. The control word for the odd unit is then selected from the same table as the word selected for that one of the other two units which is operating at the higher power level. For example, if the user turns on units 14(a), 14(b) and 14(c) (action state 1110), the control words for 14(a) and 14(b) will be selected from Tables A and B respectively. The control word for 14(c) will be selected from Table A if the level selected for 14(a) is equal to or higher than the level selected for unit 14(b), and selected from Table B otherwise.

The maximum neutral line current occurs when only two units are operating, both of which are energized by the same power signal and both of which are operating at 100% power. In this operating condition no reduction is achievable via misalignment of current pulses since there are no OFF times for either unit, nor is there any cancellation effect of current in the neutral line since both elements are energized in phase. Turning on a third unit energized 180° out of phase will, due to the difference in phase, actually reduce the magnitude of the instantaneous current flowing in the neutral line even though the total current in the system will increase. Thus, implementing the power control scheme in accordance with the present invention permits the neutral line to be designed to handle the maximum instantaneous current for two surface units operating at 100% power only, rather than four as would be the case if all units are energized by the same power signal and alignment of the ON cycles is uncontrolled.

Microprocessor Embodiment

Figure 8:
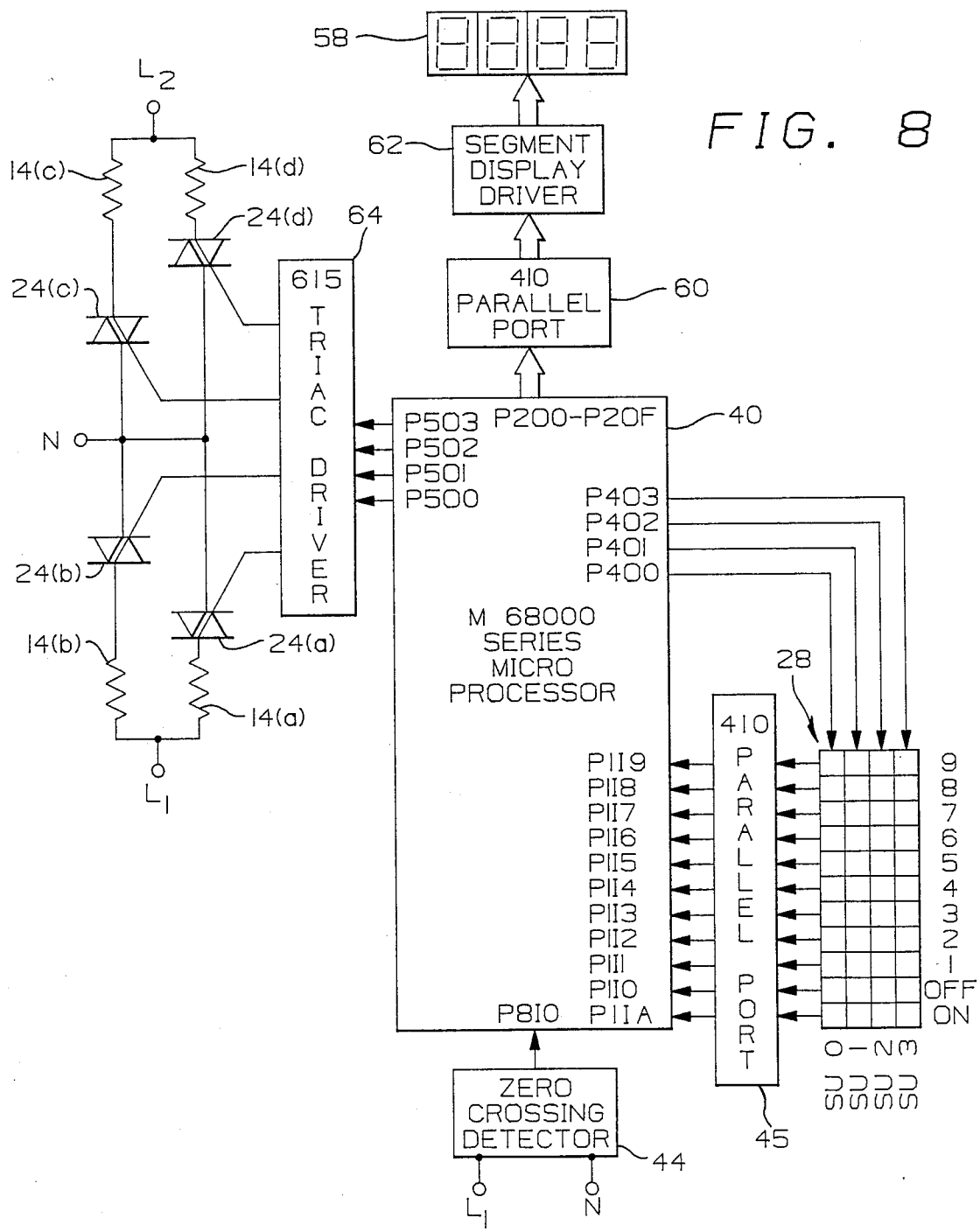
FIG. 8 is a simplified schematic circuit diagram of a control circuit illustratively embodying the power control system of the present invention as embodied in the cooktop of FIG. 1.

FIG. 8 schematically illustrates an embodiment of a power control system for the cooktop of FIG. 1 which performs power control functions in accordance with the present invention. In this control system power control is provided electronically by microprocessor 40. Microprocessor 40 is a M68000 series microprocessor of the type commercially available from Motorola. Microprocessor 40 has been customized by permanently configuring its read only memory (ROM) to implement the control scheme of the present invention.

As previously described with reference to FIG. 4, keyboard 28 is a conventional tactile touch type entry system. The keyboard array comprises four columns of 11 keys each. Columns for controlling heating elements 14(a)-14(d) are designated SU0 through SU3 respectively. The keys enable a user to select power levels 1 through 9 in addition to On and Off for each of the four heating units. Keyboard 28 has one input line for each column commonly shared by all keys in that column and 11 output lines, one for each row of keys. Each particular column of keyboard 28 is scanned by periodically generating scan pulses sequentially at outputs P400 through P403 of microprocessor 40. These pulses are transmitted as they appear to the corresponding column input lines of keyboard 28. This voltage is transmitted essentially unchanged to the output lines of all the untouched keys. The output of an actuated key will differ, signifying actuation of the key in that row and column.

In this manner each column of keyboard 28 is scanned for a new input periodically at a rate determined by the control program stored in the ROM of microprocessor 40. The output from keyboard 28 is coupled to input ports P1IO-P1IA of microprocessor 40 via a 410 parallel port interface circuit. As will become apparent from the description of the control routines which follow, each column is scanned once every four complete power cycles of the power signal appearing on lines L1 and N.

Conventional zero crossing detector circuit 44 generates a zero crossing signal marking zero crossings of the power signal appearing across L1 and N. The zero crossing signal is input to microprocessor 40 at input port P8IO. The zero crossing signal from circuit 44 is illustrated as wave form F of FIG. 7. The pulses mark the positive going zero crossings of the power signal across lines L1 and N of the AC power supply. The zero crossing signals are used to synchronize the triggering of the triacs with zero crossings of the power signal and for timing purposes in the control program executed by microprocessor 40.

Microprocessor 40 transmits triac trigger signals from I/O ports P500 through P503 to the gate terminals of triacs 24(a)-24(d) respectively via a conventional 615 triac driver circuit 64. Triac driver circuit 64 amplifies the outputs from ports P500-P503 of microprocessor 40 and isolates the microprocessor from the power line. Display data is transmitted from I/O ports P200-P20F. Display 58 is a conventional four digit display, each digit comprising a 7-segment LED display. Display information is coupled from I/O ports P200-P20F to the display segments via a conventional 410 parallel port interface circuit 60 and a conventional segment display decoder driver circuit 62 in a manner well known in the art.

Control Program

The control program comprises a set of predetermined control instructions stored in the read only memory (ROM) of microprocessor 40 to enable microprocessor 40 to obtain, store and process the input data from the keyboard and generate control signals for triggering the triacs in a manner which provides the power pulse repetition rate required to apply appropriate power levels to each of the heating units. A separate file in the random access memory (RAM) of the microprocessor is associated with each of heating units 14(a)-14(d). Each file stores the control information for its associated heating unit which is acted upon by the instructions in the ROM. Execution of the control program is synchronized with the 60 Hz power signal such that the set of control instructions in the ROM is cycled through once during each cycle of the power signal. A file register common to all four files functioning as a four count ring counter is incremented once during each pass through the control program. The count of this file register identifies the RAM file to be operated on by the control instructions during the ensuing pass through the control program. By this arrangement the control program is executed for any one particular heating unit once every four cycles of the 60 Hz power signal.

The control program is logically divided into a set of sub-routines which includes the Scan routine, the Keyboard Decode routine, the Power Word Shift routine, the PSET routine, and the Power Out routine. FIGS. 9-13 are flow diagrams which illustrate these control routines. From these diagrams one of ordinary skill in the programming art could prepare a set of instructions for permanent storage in the ROM of microprocessor 40 which would enable the microprocessor to perform the control functions in accordance with this invention. It will be appreciated that other sub-routines may also be included to perform control functions unrelated to the present invention.

The Scan routine (FIG. 9), which contains the file register identifying the RAM file to be acted upon during the ensuing pass through the control program, sets the scan line for the keyboard column associated with the heating unit which is the subject of the current pass through the routine, reads the input from the keyboard for that heating unit, and stores the user selected power setting selection information in temporary memory. The Keyboard Decode routine (FIG. 10) validates keyboard entries and updates the control variable representing the power level selected by the user as appropriate to reflect the most recent valid user input for that heating unit. The Power Word Shift routine (FIG. 11) checks the operating state, that is the combination of heating units and power settings selected by the user to determine if a shift from the default mode for power word selection is required.

While the determination of what power level to be applied to a heating unit is determined only during execution of the control program for that particular heating unit, a triac triggering decision must be made for the ensuing power cycle for each of the units during each pass through the program. The PSET routine (FIG. 12) obtains power level information from the RAM file for all four heating units during each pass through the routine, performs a table look-up to select the appropriate control word for each heating unit, checks the appropriate bit of the power level control word for each heating unit, and generates a four bit trigger control word which identifies which heating units are to be triggered on and which are to be off during the next power cycle. This four bit control word is then used by the Power Out routine (FIG. 13) which monitors the input from the zero crossing circuit and triggers those triacs associated with heating units to be energized during the next power cycle into conduction upon detection of the next occurring positive going zero crossing of the power signal. Each of the aforementioned control routines will now be described in greater detail with reference to the flow diagrams of FIGS. 9-13.

Figure 9:
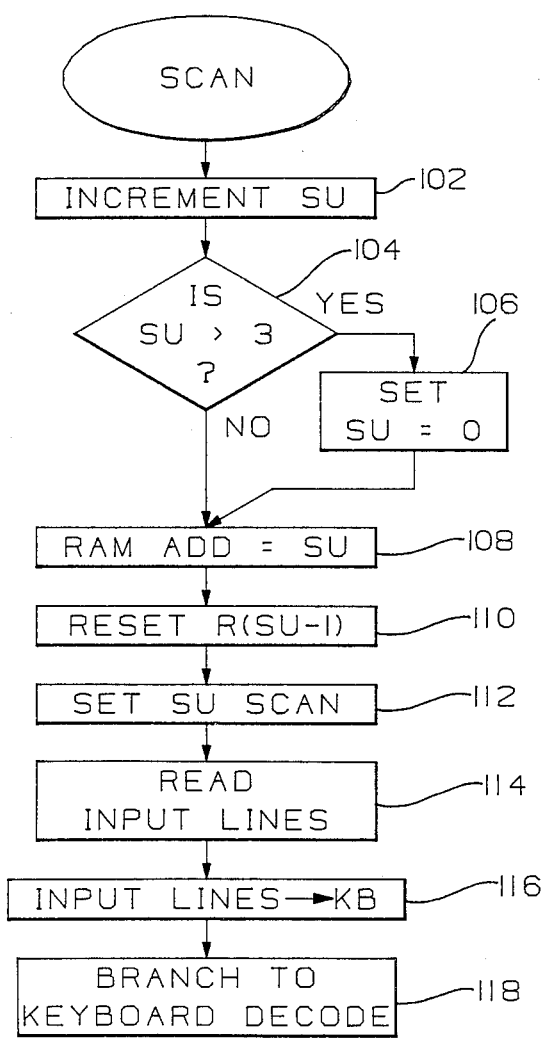
FIG. 9 is a flow diagram of the Scan routine incorporated in the control program for the microprocessor in the circuit of FIG. 8.

SCAN Routine—FIG. 9

The function of this routine is to address the appropriate RAM file for the current pass through the program, set the appropriate scan line for the keyboard, and read in the input information from the keyboard for the heating unit associated with the designated RAM file. RAM file register SU functions as a four count ring counter which counts from 0 to 3. Counts 0 through 3 of the SU counter identify RAM files for surface units 14(a)-14(d) respectively.

Upon entering the Scan routine the register SU is incremented (Block 102) and Inquiry 104 determines if SU is greater than 3. If so, the counter is reset to 0 (Block 106). Next the address of the RAM file to be acted upon during this pass through the control program is set equal to SU (Block 108). The scan line set during the previous pass through the control program designated R(SU-1) is reset (Block 110). The scan line associated with the surface unit for the current pass through the program designated R(SU) is set (Block 112). The data of input lines P1IA through P1I9 are read in, conveying the current input information for this RAM file from keyboard 28 (Block 114) and this information is stored as variable KB (Block 116). The program then branches (Block 118) to the Keyboard Decode routine of FIG. 10.

Figure 10:
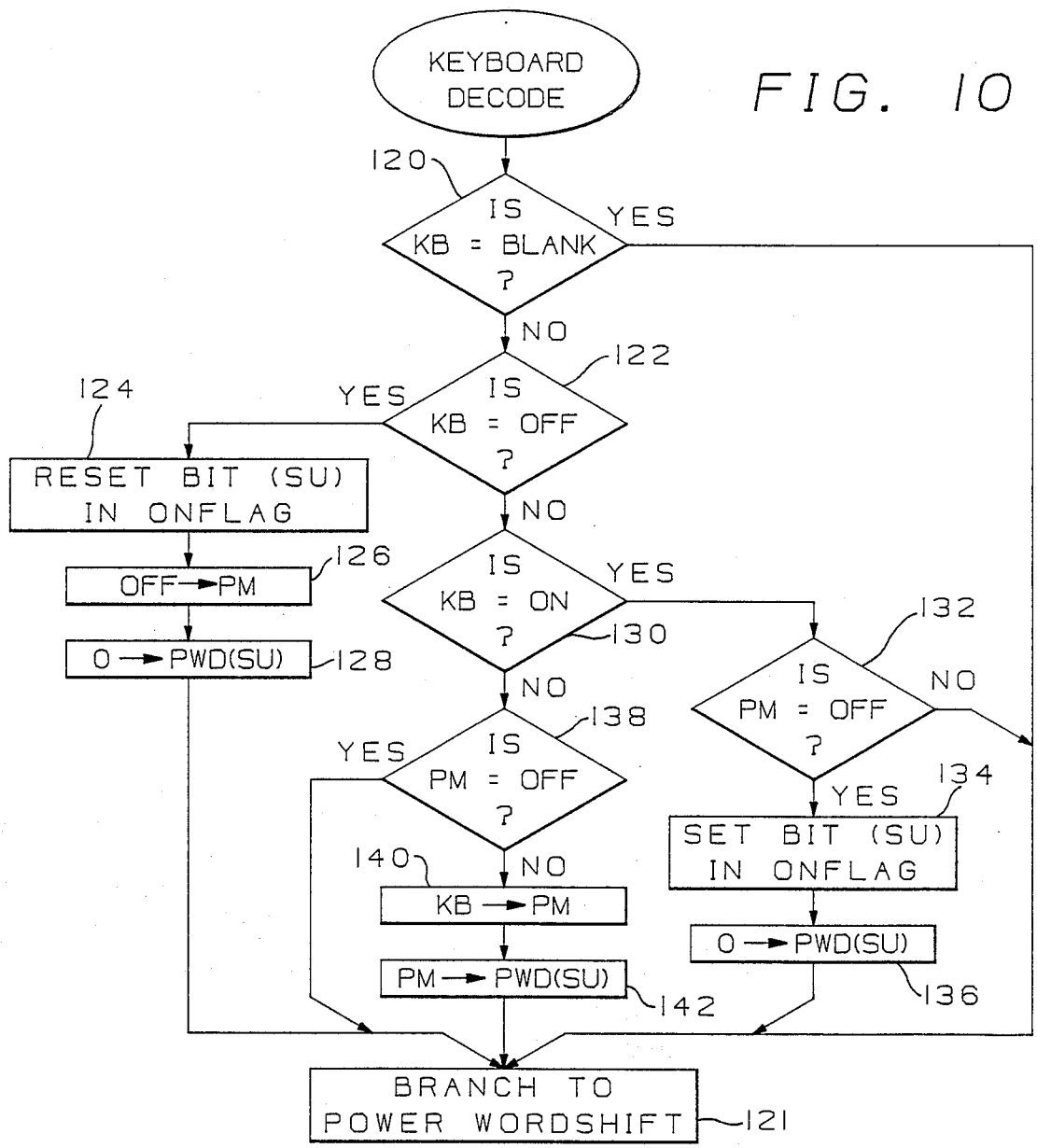
FIG. 10 is a flow diagram of the Keyboard Decode routine incorporated in the control program for the microprocessor in the circuit of FIG. 8.

KEYBOARD DECODE Routine—FIG. 10

The Keyboard Decode routine validates inputs from keyboard 28 and updates the user selected power setting variable accordingly. The routine first determines if the new keyboard entry is a blank signifying no input, an Off entry, an On entry, or one of the power levels 1 through 9. To be valid when switching the heating unit from Off to another power setting, the On key must be actuated first followed by the desired power setting. The variable PM initially represents the previous non-blank KB entry which is updated to represent the current non-blank KB entry. The variable PWD represents the user selected power setting. PWD is only changed in response to user inputs.

Figure 11:
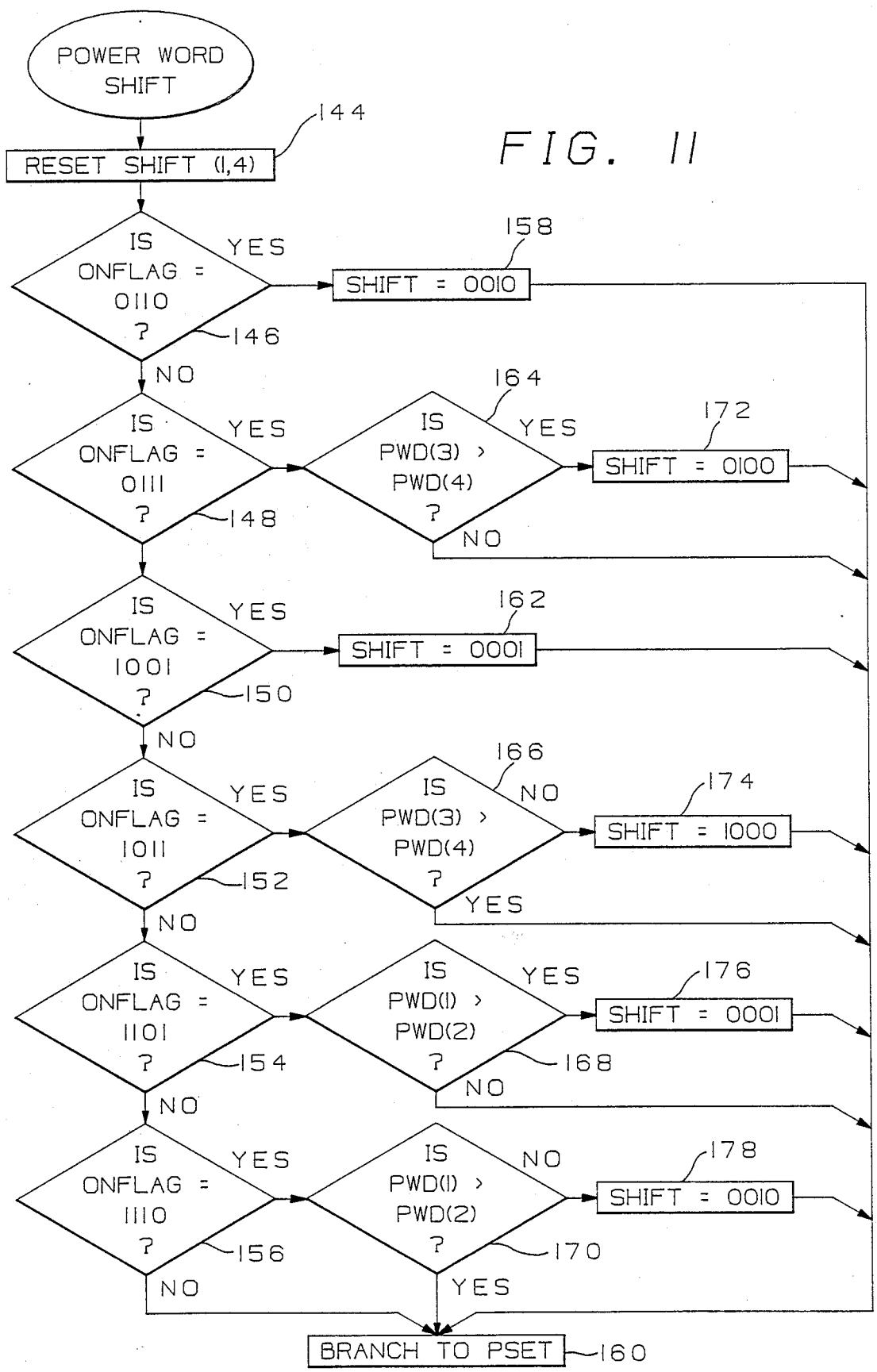
FIG. 11 is a flow diagram of the Power Word Shift routine incorporated in the control program for the microprocessor in the circuit of FIG. 8.

Inquiry 120 determines if KB is a blank. If so, the program branches (Block 121) to Power Word Shift routine (FIG. 11). If not, Inquiry 122 determines if the new entry is an OFF setting. If so, the ONFLAG bit (used in the Power Word Shift routine) is cleared (Block 124), the variable PM is set to OFF (Block 126), the variable PWD is assigned the value 0 representing the Off power setting (Block 128), and the program branches (Block 121) to the Power Word Shift routine of FIG. 11. If KB is not Off, Inquiry 130 determines if the new entry is the On setting. If so, Inquiry 132 determines if PM is OFF. If so, signifying a transition from OFF to ON, the appropriate ONFLAG bit is set (Block 134), 0 is stored as PWD (Block 136) and the program branches (Block 121) to the Power Word Shift routine.

If the answer to Inquiry 130 is No, signifying that the new entry is one of power levels 1 through 9, Inquiry 138 checks PM. If PM equals OFF, signifying the user has attempted to go from Off to a power level without first actuating the On key, the new entry is ignored and the program branches (Block 121) to the Power Word Shift routine. If PM is not equal to OFF, the power setting input is valid. KB is stored at PM (Block 140); variable PWD is assigned the new value of PM corresponding to the new entry KB (Block 142); and the program branches (Block 121) to the Power Word Shift routine (FIG. 11).

POWER WORD SHIFT Routine—FIG. 11

The function of this routine is to determine if the combination of heating units and power settings selected by the user requires a shift from the default mode of power word selection from Tables A and B of Table II. It will be recalled that in the default mode or condition the power words for controlling heating units 14(a) and 14(c), which are energized by L1 and L2 respectively, are selected from Table A and for units 14(b) and 14(d), which are energized by L2 and L1 respectively, are selected from Table B. The control words in Table B are shifted relative to Table A in order to minimize the alignment or overlap of logical one bits between words from different tables. By this arrangement the concurrence of ON cycles is minimized for units energized by the same power signal and maximized for units energized by different power signals. Certain combinations of heating unit selections require a departure from the default mode to provide the desired alignment of ON bits. The operating states or conditions representing these combinations are listed in Table IIIB.

The user selected combination of heating units is represented by the four bit variable ONFLAG. The bit pattern for ONFLAG is set in the Keyboard Decode routine (FIG. 10). In the Power Word Shift routine ONFLAG is decoded to determine if a departure from the default mode is required. The variable SHIFT is a four bit variable which is assigned a bit pattern in this routine for use in the PSET routine (FIG. 12) to implement the shift as hereinafter described. Each bit in SHIFT represents one of the four heating units. When a shift from the default mode is required for a particular heating unit, the corresponding bit in SHIFT is set to logical 1.

Referring now to the flow diagram of FIG. 11, the four bits of SHIFT are reset to logical zero (Block 144). Inquiries 146–156 decode ONFLAG to determine the user selected operating state.

Specifically, a Yes to Inquiry 146 signifies that units 14(b) and 14(c) have been selected (ONFLAG=0110). SHIFT is set to (0010) (Block 158) signifying that the control word for unit 14(c) is to be selected from Table A instead of Table B in order to achieve the desired alignment of ON cycles and the program branches to PSET routine (Block 160). Similarly, a Yes to Inquiry 150 signifies that units 14(a) and 14(d) have been selected. SHIFT is set to (0001) (Block 162) signifying that the control word for 14(d) is to be selected from Table A instead of Table B as in the default condition.

Inquiries 148 and 152–156 check ONFLAG for operating states in which three heating units are selected by the user. It will be recalled that for such conditions, two units are necessarily energized by the same power signal and the remaining odd unit is energized by the other power signal. In order to minimize neutral line current, the power control word for the odd unit is selected from the same set as that one of the other two units operating at the higher power level. Inquiries 164–170 determine which of the two units energized by the same signal is operating at the higher power setting. The appropriate adjustment to SHIFT is then made at Blocks 172–178. For example, a Yes to Inquiry 164 signifies that units 14(b), 14(c) and 14(d) have been selected by the user. In this combination units 14(c) and 14(d) are energized by the same signal, namely the signal at L2, and unit 14(b) is the odd unit energized by the signal at L1. The variables PWD(3) and PWD(4) represent the selected power settings for units 14(c) and 14(d) respectively. Inquiry 164 determines which unit is operating at the higher setting. If unit 14(c) is operating at the higher setting (PWD(3)>PWD(4)), then SHIFT is set to (0010) (Block 172) causing the control word for 14(b) to be selected from Table A, the same table that provided the control word for 14(c). If 14(d) is operating at the higher level, SHIFT remains (0000), and the control word for 14(b) will be selected by default from Table B, the same table that provided the control word for unit 14(d).

Figure 12:
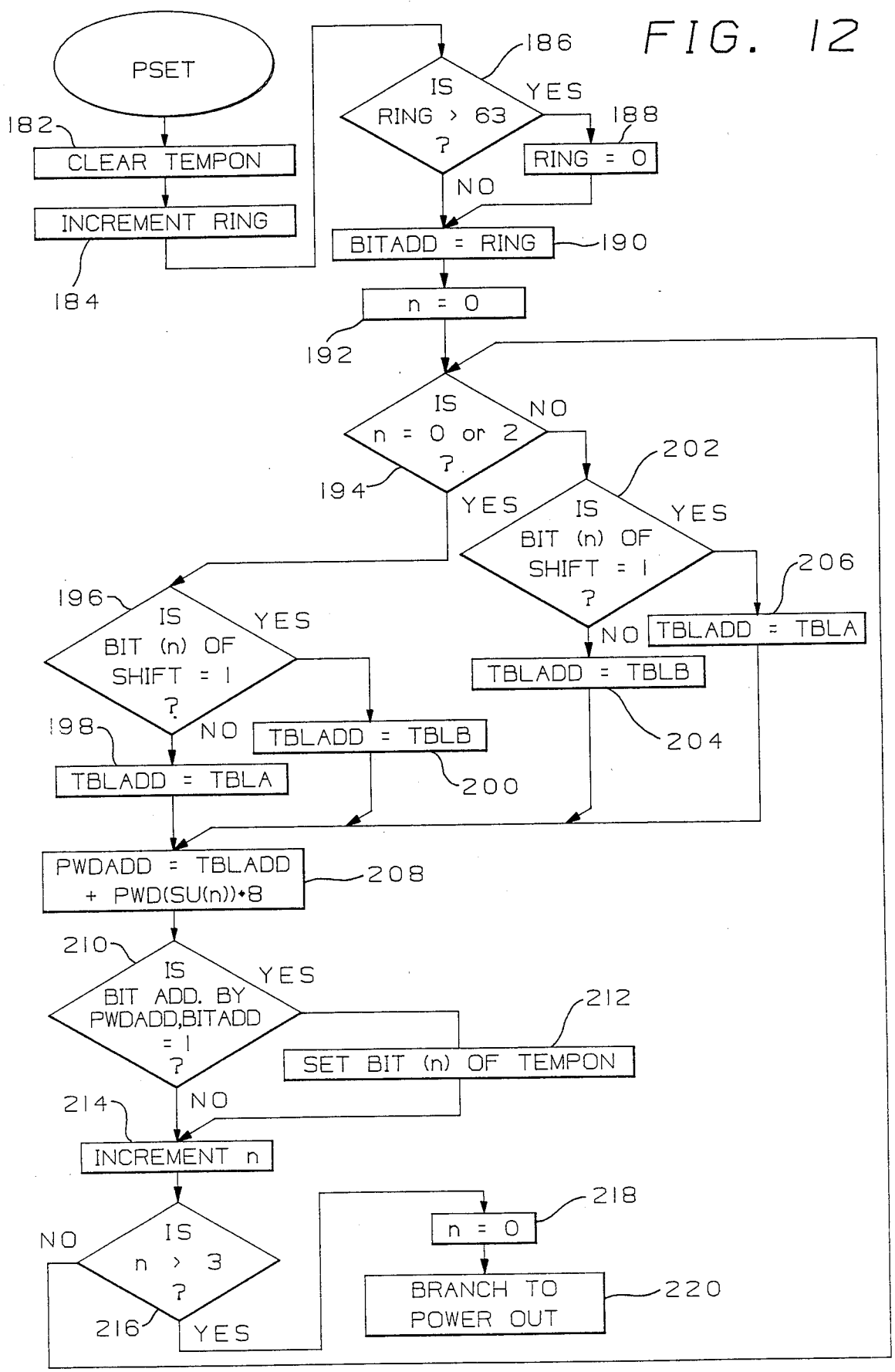
FIG. 12 is a flow diagram of the PSET routine incorporated in the control program of the microprocessor in the circuit of FIG. 8.

Having established the correct bit pattern for SHIFT, the program branches (Block 160) to the PSET routine (FIG. 12).

PSET Routine—FIG. 12

The function of this routine is to make the triac triggering decision for the next occurring power signal cycle. This decision is made for all four heating units during each pass through the control program. Use is made in this routine of information from each of the four heating unit RAM files each time through the routine.

It will be recalled that the power pulse repetition rate for each power level is defined by the bit pattern of a 64 bit control word with the logical one bit representing an On cycle and logical zero representing an OFF cycle. The bits of the control word for each heating unit representing the power level to be applied to it are tested sequentially with one bit being tested each pass through this routine. The state of that tested bit determines whether the triac for the corresponding heating unit will be triggered on or not at the beginning of the next power signal cycle.

This routine performs a Table Look-Up function to find the appropriate control word for each of the four surface units and then checks the state of the appropriate bit in that word. The triac triggering information is then stored in a four-bit word designated TMPON, which is used in the Power Out routine (FIG. 12) to generate the appropriate triac trigger signals.

An indexing variable n is used to iterate the table look-up loop four times during each pass through the routine, once for each heating unit.

It will be recalled that in the default mode, control words are to be selected from Table A for units 14(a) and 14(c) (n=0 and n=2 respectively) and from Table B for units 14(b) and 14(d) (n=1 and n=3 respectively).

TBLA and TBLB respectively represent the addresses of the starting locations in RAM for the sets of control words tested in Tables A and B of Table II. The variable TBLADD is set equal to the appropriate one of TBLA or TBLB. The variable SHIFT is tested to determine if a departure from the default mode is required because of the combination of heating units and power settings selected by the user. The variable PWDADD is the address of the control word representing the power level to be applied to the $n^{th}$ heating unit. As can be seen in Tables A and B of Table II, the address for any particular power word is obtained by multiplying the assigned value of PWD representing the selected power level, which is a number 0 through 9, by a factor of 8 and adding this to TBLADD.

The variable designated BITADD represents the location within the 64 bit control word of the bit to be tested with 0 and 63 corresponding to the location of the most significant bit and least significant bit respectively.

Referring to FIG. 12, on entering this routine the control word TMPON is cleared (Block 182) and a ring counter which counts from 0 to 63 is incremented (Block 184). Inquiry 186 determines if the counter is greater than its maximum count of 63. If so, it is reset to 0 (Block 188). Next BITADD is set equal to the count of the ring counter thereby defining the location within the control word for the bit to be tested for each heating unit (Block 190). The same bit location is tested for each of the heating units.

The indexing variable n is initialized to zero at Block 192. Inquiry 194 checks the indexing variable to determine which default mode table should be selected. If n=0 or n=2, the program proceeds to Inquiry 196 which checks the state of the appropriate bit of SHIFT. If the tested bit is zero, no shift is required and TBLADD is set equal to TBLA (Block 198). If the tested bit is a logical 1, TBLADD is set equal to TBLB (Block 200). If n=1 or n=3, Inquiry 202 tests the appropriate bit of SHIFT. If the bit is zero, TBLADD is set equal to TBLB (Block 204); if the bit is a logical one, TBLADD is set equal to TBLA (Block 206).

Having established the correct table for selection of the control word, the address of the applicable control word for the power level to be applied to the $n^{th}$ heating unit, PWDADD, is determined at Block 208. The state of the bit location defined by the variable BITADD in the control word located at the address PWDADD is then tested (Inquiry 210). If the tested bit is a logical 1, the $n^{th}$ bit of the control word TMPON is set (Block 212). Otherwise, the $n^{th}$ bit of TMPON will remain 0. After the index n is incremented (Block 214) the value of n is checked (Inquiry 216). If n is not greater than 3, the program returns to Inquiry 194 to test the bit for the control word for the next heating unit. If n is greater than 3, signifying that the loop has been iterated four times, n is reset (Block 218) and the program branches (Block 220) to the Power Out routine (FIG. 13).

POWER OUT Routine—FIG. 13

The function of this routine is to trigger triacs 24(a)-24(d) to implement the triac triggering decision for the next power cycle for each of the four heating units. The triggering of triacs 24(a)-24(d) is synchronized with the positive going zero crossings of the power signal across L1 and N.

Referring now to the routine in FIG. 13, on entering this routine the output latches P500-P503, which control the triacs, are reset (Block 222). Next the program reads in the input from the input port P8IO representing the state of the zero cross detector (Block 224) and Inquiry 226 checks the state of this input until it switches to a logical 1 signifying the occurrence of a positive going zero crossing of the power signal. When P8IO equals 1, the program proceeds to Inquiry 228 to sequentially check the four bits of the power word TMPON and set the appropriate one of output latches P500-P503. Index variable n is again used to sequentially check bits 0 through 3. It will be recalled that prior to branching from the PSET routine the n is reset to 0. Inquiry 228 tests the $n^{th}$ bit for a 1. If it is a 1, the output P50(n) is set (Block 230), n is incremented (Block 232) and Inquiry 234 checks for an n greater than 3. If n is less than 3, the program returns to Inquiry 228 to check the next bit and set the corresponding output port as appropriate. Those ones of output latches P500-P503 associated with bits in the variable TMPON which are in the logical one state are set. Those ones with output latches associated with zero bits in TMPON are not set. In the latter case these latches remain in the reset state since each of the latches is reset upon entering this routine.

In this fashion each bit of the control word TMPON is tested each pass through the Power Out routine, thereby making a decision to trigger or not trigger each triac during each pass through the control program. Once the loop for testing TEMPON is iterated four times, once for each heating unit, the power control decision for the power cycle has been implemented and the program returns (Block 236) to the SCAN Routine of FIG. 9.

While in accordance with the Patent Statutes a specific embodiment of the present invention has been illustrated and described herein, it is realized that numerous modifications and changes will occur to those skilled in the art. For example, the illustrative embodiment employs infrared heating units. However, the invention could also be used in conventional conduction cooktops as well. It is therefore to be understood that the appended claims are intended to cover all such modifications and changes as fall within the true spirit and scope of the invention.

What is claimed is:

1. An electric cooking appliance comprising:

a plurality of heating units for heating cooking utensils placed in proximity thereto, said heating units being arranged in two groups, a first group adapted for energization by a first AC power signal and a second group adapted for energization by a second AC power signal 180° out of phase relative to said first power signal, at least one of said first and second groups comprising more than one heating unit, the heating units of said first and second groups each being connected to a common neutral power line;

user actuable input selection means for enabling the user to select one of a plurality of power settings for each of said heating units;

power control means responsive to said user actuable input selection means for controlling the output power of each of said heating units in accordance with the user selected power setting for each unit, said power control means being operative to apply current pulses to each heating unit at a pulse repetition rate corresponding to the selected power setting for that heating unit;

said power control means being further operative to control the application of current pulses to each heating unit so as to minimize the concurrent application of current pulses to those heating units energized by the same one of said first and second signals and to maximize the concurrent application of current pulses to those heating units energized by different ones of said first and second power signals thereby minimizing peak current pulses in said common neutral line.

2. The cooking appliance of claim 1 wherein said power control means comprises memory means for storing two sets of control words, each control word comprising a plurality of bits arranged to define a bit pattern corresponding to an associated one of the user selectable power settings, said power control means including means for selecting the control word from one of said sets associated with the user selected power setting and means successively testing the state of each bit of the selected control word for each heating unit, with one bit being tested for each heating unit during each cycle of the power signal, said control means being operative at the beginning of the next occurring cycle to apply a current pulse to the associated heating unit only when said tested bit is in a first state, the bit patterns for the control words in said second set being shifted relative to corresponding control words in said first set so as to minimize the alignment of first state bits for control words in said second set relative to control words in said first set, said means for selecting the control word being operative to select control words from the same set to control energization of heating units energized by different ones of said first and second power signals and to select control words from different sets to control energization of said heating units energized by the same one of said first and second power signals, whereby the concurrence of current pulses for heating units energized by the same power signal is minimized and the concurrence of current pulses for heating units each energized by a different one of said power signals is maximized.

3. The cooking appliance of claim 2 wherein said power control means is further operative when operating two heating units from one of said groups and one from other of said groups to select the control word for said one unit from the set of control words which maximizes the concurrence of current pulses applied to said one unit with current pulses applied to that one of said two heating units which is being operated at the higher power setting so as to minimize current in said neutral power line.

4. The cooking appliance of claim 3 further comprising a glass ceramic cooktop surface for supporting cooking utensils to be heated and wherein said heating units are radiant heating units disposed beneath said glass ceramic cooktop for heating utensils supported thereon, said radiant heating units being characterized by a positive temperature coefficient effective to change the resistance of said heating units by approximately an order of magnitude when the temperature of the element is increased from room temperature to its normal operating temperature, and further characterized by a high thermal time constant.

5. An electric cooking appliance comprising:

a plurality of heating units for heating cooking utensils placed in proximity thereto, said heating units being arranged in two groups, a first group adapted for energization by a first AC power signal and a second group adapted for energization by a second AC power signal 180° out of phase relative to said first power signal, at least one of said first and second groups comprising more than one heating unit, the heating units of said first and second groups each being connected to a common neutral power line;

user actuable input selection means for enabling the user to select one of a plurality of power settings for each of said heating units;

switch means associated with each of said heating units for independently coupling the appropriate one of said first and second power signals to its associated heating unit, each of said switch means being switchable between a conductive state and a non-conductive state;

said power control means including memory means for storing a plurality of power control words divided into a first set and a second set, said first and second sets of control words each containing a control word for each user selectable power setting, each of said control words comprising a plurality of bits, each bit having an ON state and an OFF state, the bit pattern for each control word defining the pulse repetition rate for the corresponding user selectable power setting;

said second set comprising control words corresponding to each of said control words in said first set, and identical thereto, except that the bit patterns for said control words in said second set are offset relative to those in said first set to minimize the alignment of ON bits between words in said second set and words in said first set;

said power control means including means for selecting control words from said first and second sets for each heating unit according to the user selected power settings for each heating unit and means for sequentially testing the state of each bit in the selected control;

said power control means being operative to select control words for the selected power settings from said first and second sets so as to minimize the concurrent application of current pulses to heating units energized by the same power signal and to maximize the concurrent application of current pulses to heating units energized by different power signals, thereby minimizing peak current pulses in said common neutral line.

6. The cooking appliance of claim 5 wherein said power control means is operative to select control words from each of said first and second sets for units energized by the same one of said first and second power signals and to select control word from the same set for heating units energized by different ones of said first and second power signals.

7. The cooking appliance of claim 6 wherein said plurality of heating units comprises at least four heating units with two units in each of said first and second groups and wherein said power control means is further operative when operating any three of said four surface units to choose a power control word for that one of said three heating units not energized by the same one of said first and second power signals from that one of said first and second sets which maximizes the concurrent application of current pulses to said one heating unit and that one of the two units energized by the same signal operating at the higher power setting.

8. The cooking appliance of claim 7 further comprising a glass ceramic cooktop surface wherein said heating units are radiant heating units disposed beneath said glass ceramic cooktop for heating utensils supported on said cooktop, said radiant heating units being characterized by positive temperature coefficient effective to change the resistance of said heating units by approximately an order of magnitude when the temperature of the element is increased from room temperature to its normal operating temperature, and further characterized by a large time constant for thermal response.

* * * * *

UNITED STATES PATENT AND TRADEMARK OFFICE
CERTIFICATE OF CORRECTION

PATENT NO. : 4,786,799

DATED : November 22, 1988

INVENTOR(S) : Louis A. Welle, Jr. and Thomas R. Payne

It is certified that error appears in the above-identified patent and that said Letters Patent is hereby corrected as shown below:

Claim 5, line 61, after "control" insert --word--.

Signed and Sealed this

Fourth Day of April, 1989

Attest:

DONALD J. QUIGG

Attesting Officer

Commissioner of Patents and Trademarks